A. A. BAMFORD.
CYCLE ATTACHMENT.
APPLICATION FILED MAY 20, 1912.

1,068,835.

Patented July 29, 1913.

2 SHEETS—SHEET 1.

Witnesses
W. S. McDowell
A. C. Hines

Inventor
A. A. Bamford
By Victor J. Evans
Attorney

A. A. BAMFORD.
CYCLE ATTACHMENT.
APPLICATION FILED MAY 20, 1912.
1,068,835.
Patented July 29, 1913.
2 SHEETS—SHEET 2.
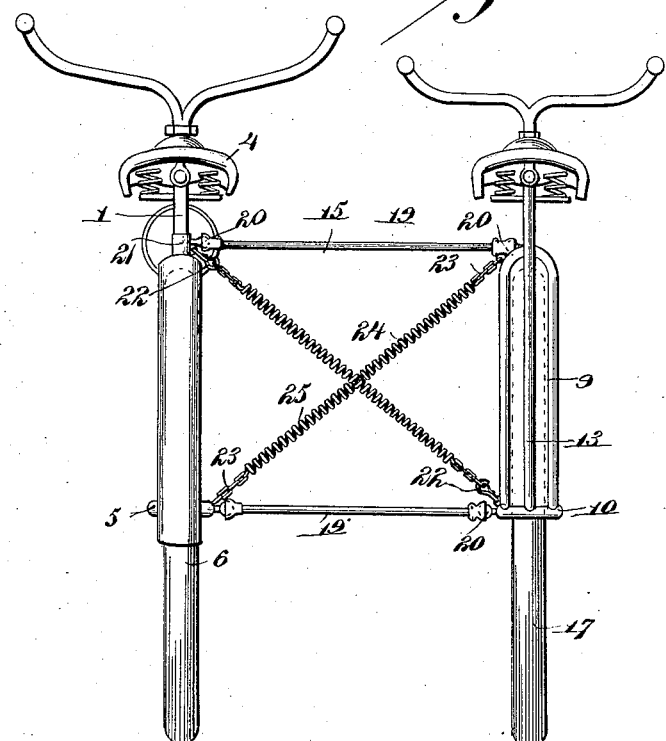
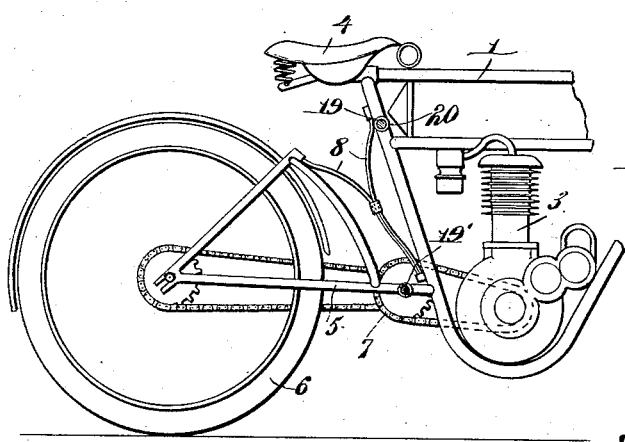
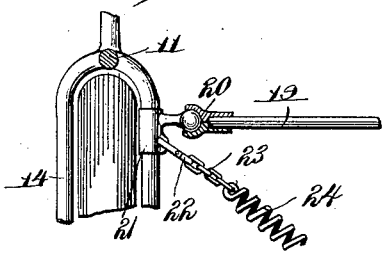
Witnesses
W. S. McDowell
C. C. Hines
Inventor
A. A. Bamford
By Victor J. Evans
Attorney

UNITED STATES PATENT OFFICE.

ARTHUR A. BAMFORD, OF CHICAGO, ILLINOIS.

CYCLE ATTACHMENT.

1,068,835.  Specification of Letters Patent.  Patented July 29, 1913.

Application filed May 20, 1912. Serial No. 698,569.

*To all whom it may concern:*

Be it known that I, ARTHUR A. BAMFORD, a citizen of the United States, residing at Chicago, in the county of Cook and State of Illinois, have invented new and useful Improvements in Cycle Attachments, of which the following is a specification.

This invention relates to bicycles or motorcycles, and particularly to a wheeled supporting attachment therefor, the object of the invention being to provide a novel side attachment which is designed to support the bicycle or motorcycle in a substantially erect position while standing or running and to prevent it from skidding or tipping, and which is also designed and adapted to operate with the cushioning elements of the cycle frame to take up and absorb all shocks and jars and make the bicycle or motorcycle easy running.

A further object of the invention is to provide an attachment of the character described which may be used to carry a passenger or luggage, and which may be adapted for attachment to any ordinary make of bicycle or motorcycle frame.

The invention consists of the features of construction, combination and arrangement of parts hereinafter fully described and claimed, reference being had to the accompanying drawings, in which:—

Figure 1:
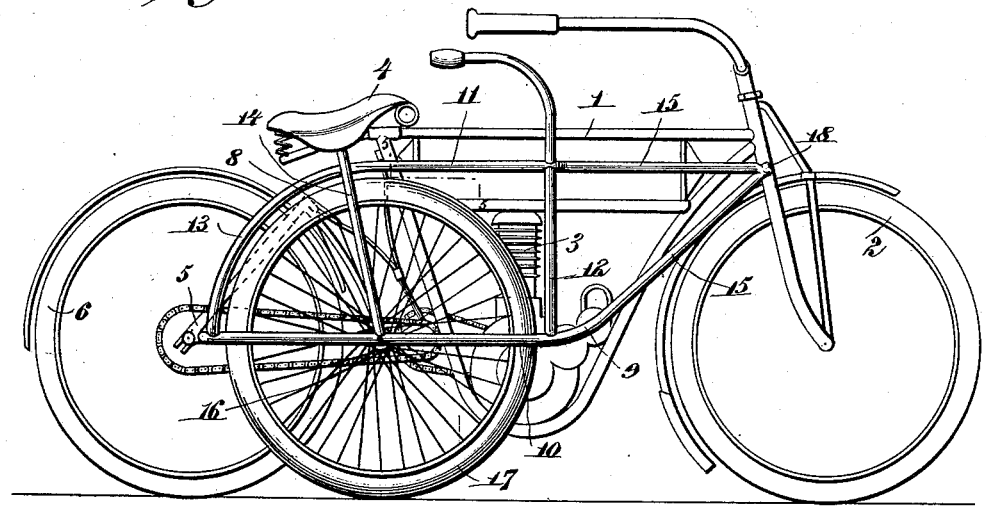
Figure 2:
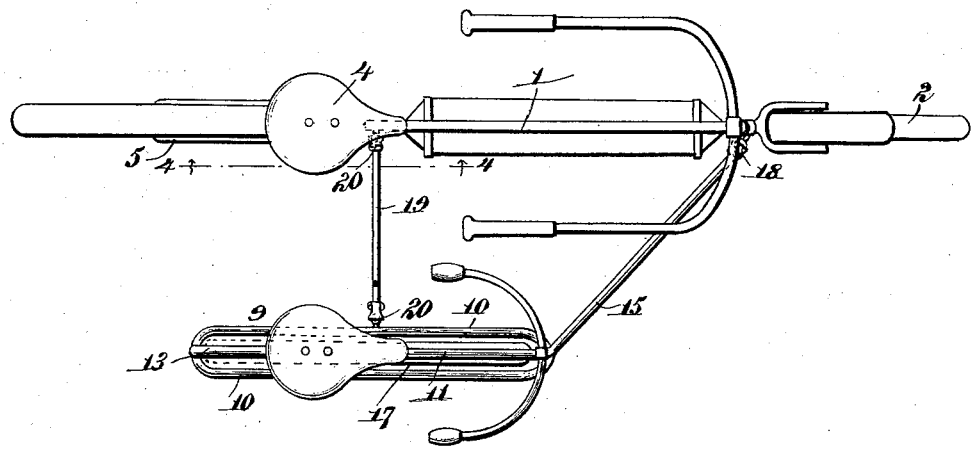

Figure 1 is a side elevation of a motorcycle equipped with my attachment. Fig. 2 is a top plan view of the same. Fig. 3 is a rear elevation of the motorcycle with the attachment applied. Fig. 4 is a vertical transverse section on the line 4—4 of Fig. 2. Fig. 5 is a detail section on the line 5—5 of Fig. 1.

In the present instance, I have shown the application of my invention to a motorcycle having a main frame 1, which carries the front supporting and steering wheel 2, the driving motor 3 and the operator's seat 4, and a rear frame section 5 which carries the rear driving and supporting wheel 6, and which is pivotally connected, as by the countershaft 7 of the drive gearing of the machine, with the main frame section to adapt the said frame sections to have relative motion in passing over irregularities of ground surface, etc., to take up and absorb all shocks and jars to thereby effectively cushion the machine while running. The relative motion of the two frame sections is controlled by an interposed cushioning spring 8 of the leaf type, the said spring being composed preferably of two sections united at their lower ends and fixed to the main frame section and having their upper ends divided and respectively connected with the main and rear frame sections.

The attachment comprises a frame 9 including spaced horizontal tubes 10 connected at their front and rear ends to each other, an upper longitudinal tube 11 connected with the tubes 10 by front, rear and side braces 12, 13 and 14. Extending forwardly from the tubes 10 and 11 are tubes 15 forming an attaching portion which is bent inwardly at an oblique angle to the main portion of the frame of the attachment. The tubes 10 support a transverse axle 16 on which is mounted a supporting wheel 17.

The attaching portion of the frame of the attachment is connected with the upper front portion of the main frame section 1 of the motorcycle by means of a ball and socket joint 18, or other suitable flexible connection, which will permit the attachment and motorcycle to have relative vertical play. The innermost tube 10 and upper tube 11 of the frame of the attachment are respectively connected with the main frame section 1 of the motorcycle and the countershaft 7 by a pair of superposed link bars or tubes 19 and 19' which are respectively secured at their extremities to the attachment frame and said motorcycle frame section 1 and countershaft by ball and socket joints 20, thus permitting the rear portions of the motorcycle and supporting frame to have relative vertical motion and to assume different angles with relation to each other. The supporting device and motorcycle are thus universally jointed together, so that in passing over irregularities of surface the motorcycle and supporting frame may travel at different levels and assume various angular positions, the motorcycle thus being supported in an effective manner to prevent it from tipping unduly or falling over while at rest or in motion, and also to prevent it from skidding when rounding a curve or traveling on slippery roads or surfaces.

Preferably the socket members of the universal joints are carried by clips 21 which are secured in any suitable manner to the frame tubes, and these clips carry snap hooks 22 which are adapted to adjustably engage short chain sections 23 at the ends of a pair of cushioning and sustaining springs 24 and 25. If desired, however, the springs may be directly connected with the clips or secured to the parts in any other suitable manner. The springs 24 and 25 are arranged diagonally and in crossed relation between the rear end of the frame of the attachment and the portion of the motorcycle frame to which said attachment is coupled, and are also disposed between the link bars or tubes, so that the springs will oppose sufficient resistance to relative play or motion between the supporting device and motor cycle to normally maintain the same in an erect position, while permitting the attachment and motorcycle to yieldingly assume angular positions, the springs thus operating to control the yielding motions of the link bars, as will be readily understood.

It will be seen that when the device is applied to the motorcycle as described, a wheeled support is arranged at one side of the motorcycle which normally sustains it in an upright position and is at the same time adapted to yield vertically so that the wheels of the motorcycle and attachment may travel at different levels in passing over irregularities of surface or obstructions, the springs taking up all shocks and jars, so that but little strain or vibration will be transmitted to the motor cycle frame. The attachment also permits the motorcycle to incline in either direction to a limited extent in traveling around curves while at the same time sustaining it against skidding motion or any tendency to turn over beyond the center of gravity, and fall. It will, of course, be understood that the attachment may be employed as a luggage carrier or be provided with a seat for transporting a passenger thus increasing its utility and efficiency.

While in the present instance I have shown the attachment applied to a motorcycle having a yielding or cushioning frame structure of the character described, it will, of course, be understood that it may be applied to any existing type of bicycle or motorcycle or constructed so as to form a permanent part of the motorcycle when built.

Such changes and modifications as are necessary for its application in these particulars are held to fall within the spirit and scope of the appended claims.

The term "bicycle" in the claims is intended to include manually or motor-driven vehicles of this character.

I claim:—

1. The combination with a motorcycle, of a wheeled support at one side of the motorcycle, said support being pivotally connected at its front end to the motorcycle frame, pivotal connections between the top and bottom portions of the rear ends of the motorcycle and support, and cushioning springs disposed in crossed relation between the rear ends of said frames and connected with the top and bottom portions thereof for limiting the pivotal play of the pivotal connections.

2. The combination with a motorcycle, of a wheeled support arranged at one side thereof, said support including a frame universally jointed to the frame of the motorcycle at its forward end, universally jointed connections between the top and bottom portions of the rear end of the frame of the support and the motorcycle frame, and crossed cushioning springs disposed between said connections and connected with the top and bottom portions of the frames for limiting the pivotal play of said connections.

3. The combination with a motorcycle, of a wheeled support arranged at one side thereof, said support being pivotally connected at its forward end to the motorcycle frame, superposed parallel members pivotally connecting the top and bottom portions of the frame and support with each other, and crossed cushioning springs arranged between said members and connected with the top and bottom portions of the motorcycle frame and support.

4. The combination with a bicycle, of a support arranged at one side thereof and comprising a wheeled frame, said frame being universally jointed at its forward end to the bicycle frame, links extending between and universally jointed to the rear end of the frame of the support and the bicycle frame, and crossed cushioning springs coupled to the motorcycle frame and support for controlling and limiting the relative pivotal play thereof.

5. The combination with a bicycle, of a support at one side thereof comprising a wheeled frame having an angularly bent forward end universally jointed to the bicycle frame, superposed links universally jointed to the frame of the support and to the bicycle frame, and crossed cushioning springs coupled to the motorcycle frame and support to control and limit the relative pivotal play thereof.

In testimony whereof I affix my signature in presence of two witnesses.

ARTHUR A. BAMFORD.

Witnesses:
C. C. HINES,
BENNETT S. JONES.